Nov. 3, 1931.    A. P. BALL    1,830,081
FRONT END CONSTRUCTION FOR VEHICLE BODIES
Filed Sept. 13, 1929    3 Sheets-Sheet 1

INVENTOR
Albert P. Ball

BY
Whittemore, Hulbert, Whittemore & Belknap
ATTORNEYS

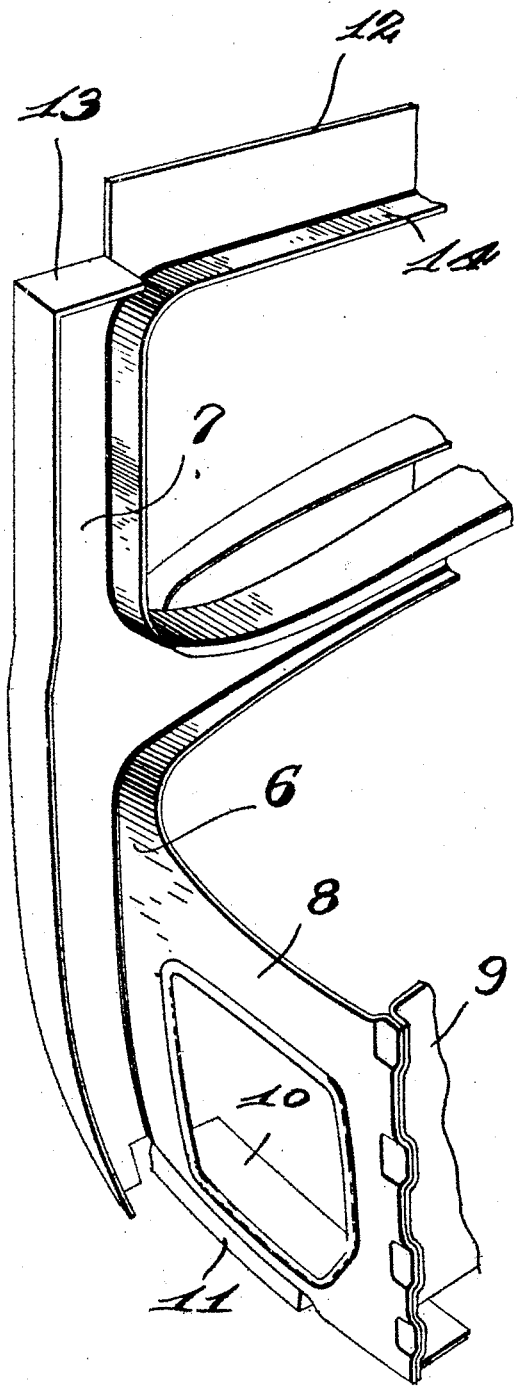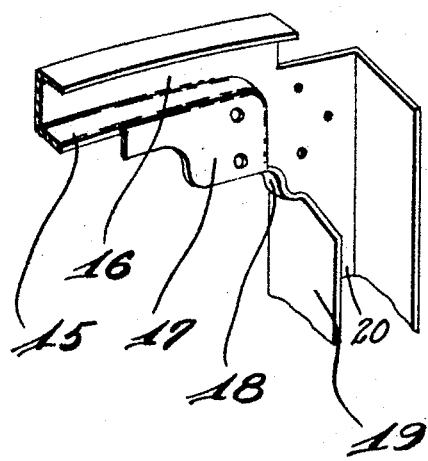

Nov. 3, 1931. A. P. BALL 1,830,081
FRONT END CONSTRUCTION FOR VEHICLE BODIES
Filed Sept. 13, 1929 3 Sheets-Sheet 3
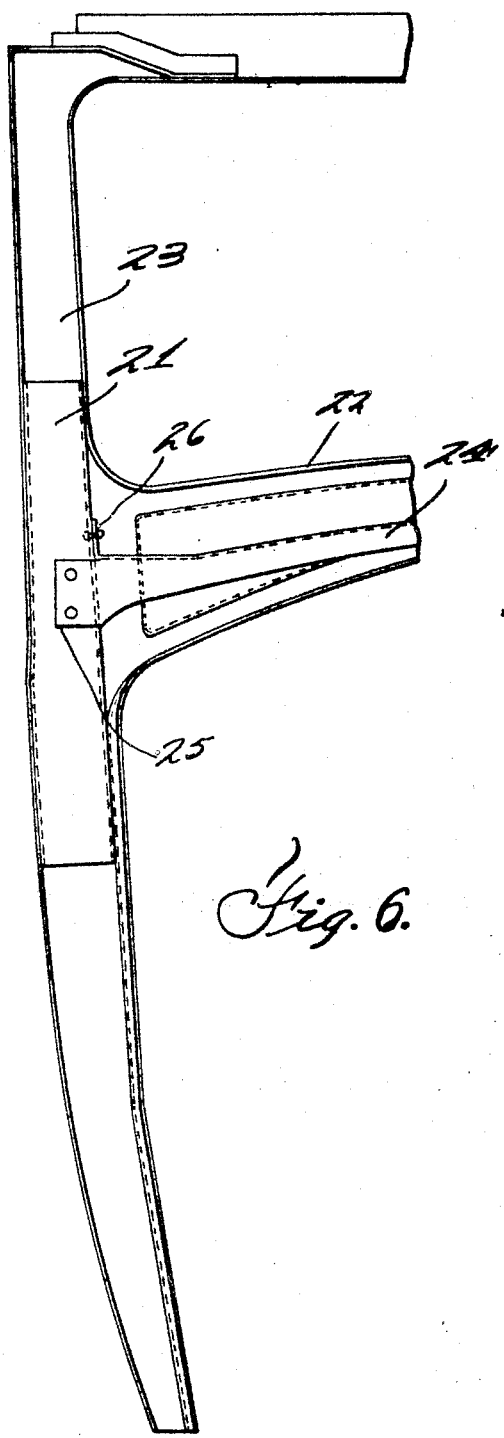
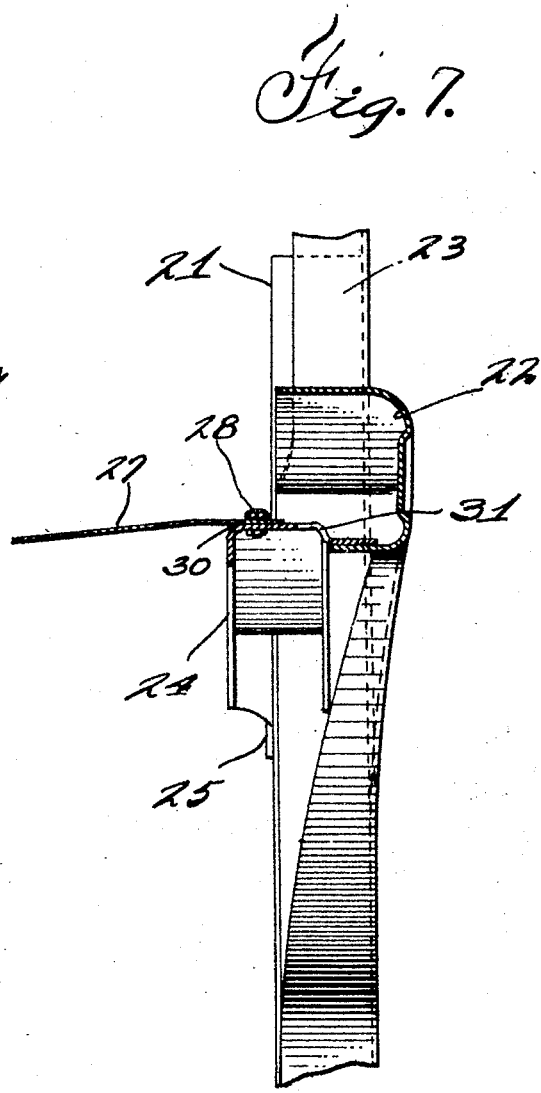
INVENTOR
Albert P. Ball
BY
Whittemore Hulbert Whittemore & Belknap
ATTORNEYS Patented Nov. 3, 1931

1,830,081

UNITED STATES PATENT OFFICE

ALBERT P. BALL, OF DETROIT, MICHIGAN, ASSIGNOR TO BRIGGS MANUFACTURING COMPANY, OF DETROIT, MICHIGAN, A CORPORATION OF MICHIGAN

FRONT END CONSTRUCTION FOR VEHICLE BODIES

Application filed September 13, 1929. Serial No. 392,304.

This invention relates generally to front end constructions for vehicle bodies and consists of certain novel features of construction, combinations and arrangements of parts that will be hereinafter more fully described, and particularly pointed out in the appended claims.

In the accompanying drawings:

Figure 4 is a fragmentary perspective view of a slightly modified construction;

Figure 5 is a sectional perspective view of a further modification;

Figure 6 is a fragmentary elevation of a further modification;

Figure 7 is a fragmentary sectional view of the construction shown in Figure 6.

Figure 1:
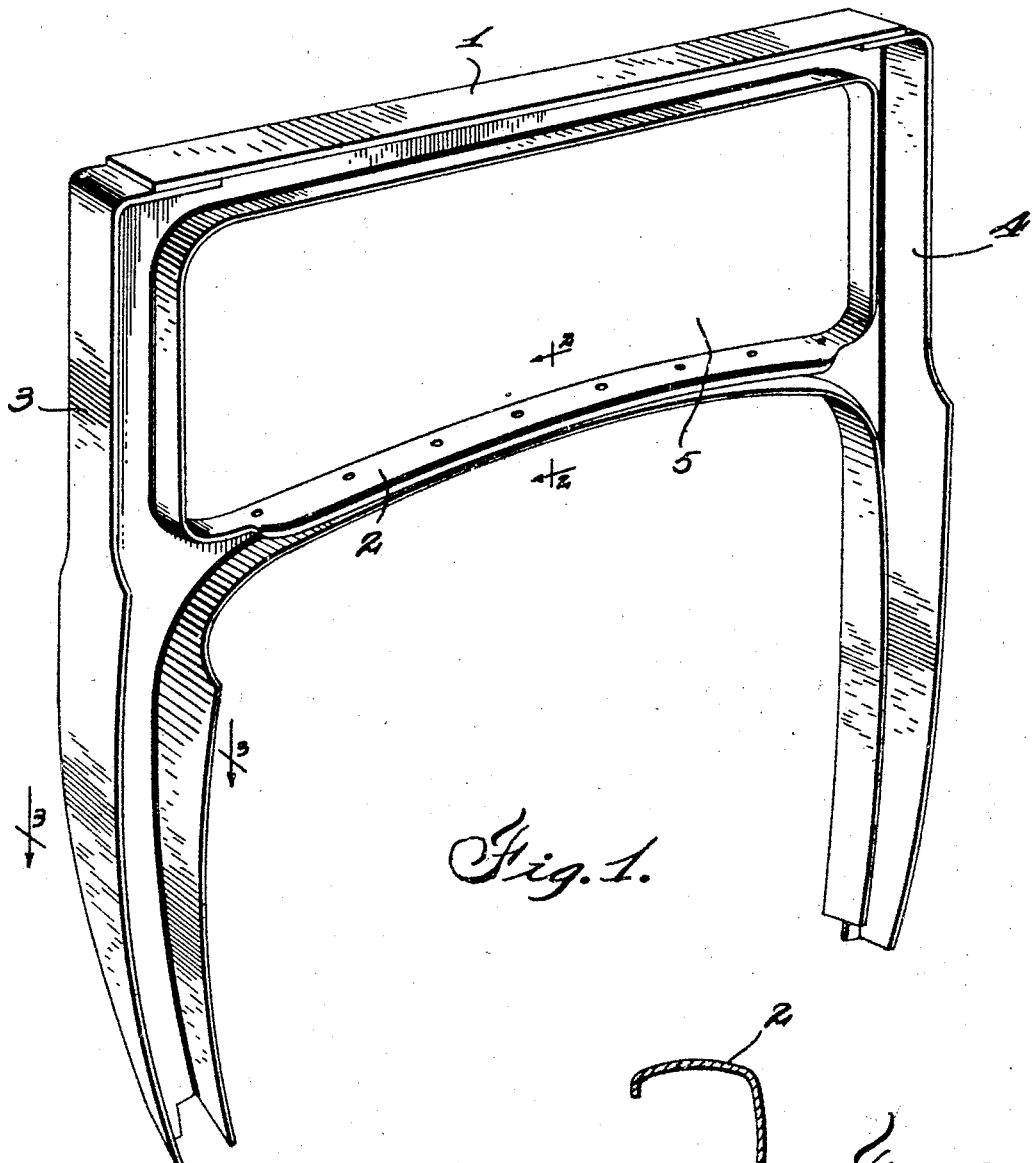
Figure 1 is a perspective view of a one piece front end construction embodying my invention.
Figure 2:
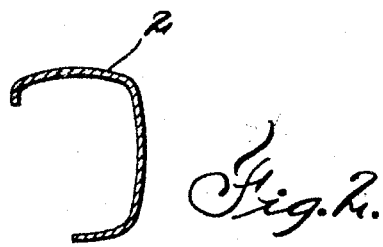
Figure 2 is a cross sectional view taken on the line 2—2 of Figure 1.
Figure 3:
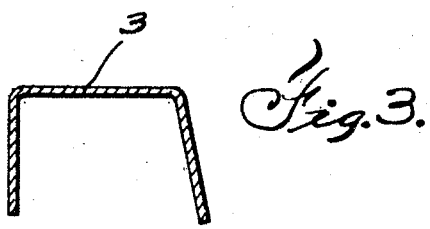
Figure 3 is a sectional view taken on the line 3—3 of Figure 1.

Referring now to the drawings, 1 is a windshield header, 2 is a belt bar, and 3 and 4 respectively are front body pillars constituting supports for the header 1 and bar 2 and cooperating therewith to form a windshield opening 5. As shown, the header 1, bar 2 and pillars 3 and 4 are pressed from a single sheet of metal and, as a unit, are secured to the vehicle body proper (not shown). In the present instance these parts 1, 2, 3 and 4 are channel shaped and open forwardly.

As illustrated in Figure 4, the inner side walls 6 of the pillars 7 have forwardly extending wings 8 that are secured to the dash 9 and have lateral flanges 10 at their lower edges resting upon and secured to wooden sill members 11 of the vehicle body. In this instance the front end construction is designed for car bodies of the sedan type and it will be noted that a portion 12 of the uppermost flange 13 of the windshield header 14 extends upwardly and is adapted to be attached to the vehicle top (not shown).

In Figure 5 the lower flange 15 of the windshield header 16 is provided at its opposite ends with depending webs 17 that serve as windshield supporting brackets. Preferably these webs 17 have portions 18 connected into the upper ends of the innermost flanges 19 of the pillars 20 and serve as corner reinforcements between the pillars and header.

As illustrated in Figure 6, reinforcing brackets 21 of substantially channel formation are secured in the channels of the pillars 23 at opposite ends of the belt bar 22, and a relatively heavy gage metal cross bar 24 is terminally connected to said brackets 21. Preferably the ends of the bar 24 have flanges 25 secured to the rear walls of the channel pillars and have upstanding flanges 26 secured to the inner walls of the channel pillars.

As illustrated in Figure 7, the cowl 27 and a suitable finish strip 28 extend over and are secured to the bar 24. In fact, such parts 24, 27 and 28 are connected together by common means such as the headed elements 30, and these in turn are concealed by the finish strip 28. Preferably openings 31 for air are formed in the overlapping portions of the bars 22 and 24 so that air passing rearwardly over the strip 28 will be deflected by the belt bar 22 into the openings 31.

Thus, from the foregoing description, it will be apparent that the one piece front end is strong and durable, eliminates objectionable joints, squeaks and noises, may be quickly and accurately made and facilitates assembly of the front end constructions to the body proper. The wings 8 eliminate the usual dash brackets and serve to stiffen the structure, particularly the pillars 7, and the lateral sill portions 10 of the wings form braces therefor and convenient means of attachment to the body sills.

What I claim as my invention is:

1. A one piece front end construction for vehicle bodies including a windshield header, a belt bar, and channel shaped pillars pressed from a single sheet of metal, the inner sides of the channels of the pillars having winged portions projecting forwardly beyond the outer sides thereof for attachment at their forward edges to a dash.

2. A one piece front end construction for vehicle bodies including laterally spaced channel shaped pillars pressed from a single sheet of metal and provided with forwardly projecting wing portions for attachment to a dash, said wing portions having lateral flanges at the lower edges attachable to body sills.

3. A one piece front end construction for vehicle bodies including a pair of laterally spaced pillars, a windshield header, and webs constituting windshield supporting brackets extending between and connecting into and reinforcing the pillars and header.

4. A one piece front end construction for vehicle bodies including a channel shaped pillar, and a windshield header having a depending web constituting a windshield supporting bracket and having a portion connecting into one side of the channel of the pillar.

5. In combination, a pair of laterally spaced pillars, a belt bar having its opposite ends connecting into said pillars, reinforcing brackets secured to said pillars and bar, a cross bar secured to said pillars, a cowl extending over the last mentioned bar, a finish strip extending over said cowl, and a common connection between said cowl, finish strip, and last mentioned bar.

6. In combination, a pair of laterally spaced pillars, a belt bar connecting into said pillars, a bar separate from but secured to said pillars and having a portion overlapping and secured to the first mentioned bar, said bars having registering openings for air, and one of said bars being channel shaped and opening forwardly for deflecting air received thereby into said registering openings.

7. A vehicle body front end construction comprising a single sheet of metal having laterally spaced upright forwardly opening channel portions and vertically spaced substantially horizontal forwardly opening channel portions, the inner flange of each upright channel having spaced portions, extending laterally inwardly and connecting into and constituting continuations of the upper and lower sides of the lowermost horizontal portions.

8. A vehicle body front end construction comprising a single sheet of metal having laterally spaced upright forwardly opening channel portions and vertically spaced horizontal forwardly opening channel portions, the inner flanges of the upright portions being shorter than the outer flanges of said portions, extending laterally inwardly and connecting into and constituting continuations of the lowermost side of the uppermost horizontal portion.

9. A vehicle body front end unit formed from one piece of sheet metal and comprising laterally spaced upright forwardly opening channel portions and vertically spaced substantially horizontal channel portions, the uppermost horizontal portion being at the upper ends of and opening into said upright portions, and the lowermost of said horizontal portion being intermediate the ends of and opening into said upright portions.

In testimony whereof I affix my signature.

ALBERT P. BALL.